US009077629B2

(12) United States Patent
Okazaki et al.

(10) Patent No.: US 9,077,629 B2
(45) Date of Patent: Jul. 7, 2015

(54) COMMUNICATION DEVICE, AND SIGNAL DEGRADATION MONITORING SYSTEM AND METHOD

(75) Inventors: Kohei Okazaki, Tokyo (JP); Akira Sakurai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 118 days.

(21) Appl. No.: 13/812,298

(22) PCT Filed: Jul. 22, 2011

(86) PCT No.: PCT/JP2011/066694
§ 371 (c)(1),
(2), (4) Date: Jan. 25, 2013

(87) PCT Pub. No.: WO2012/014804
PCT Pub. Date: Feb. 2, 2012

(65) Prior Publication Data
US 2013/0121165 A1    May 16, 2013

(30) Foreign Application Priority Data

Jul. 30, 2010   (JP) .................................. 2010-172476

(51) Int. Cl.
*G01R 31/08* (2006.01)
*H04L 12/28* (2006.01)
(Continued)

(52) U.S. Cl.
CPC .......... *H04L 43/0888* (2013.01); *H04L 1/0001* (2013.01); *H04L 43/0876* (2013.01); *H04L 43/16* (2013.01); *H04L 43/0894* (2013.01); *H04L 1/0002* (2013.01)

(58) Field of Classification Search
CPC ..... H04L 43/0829; H04L 43/08; H04L 43/00; H04L 43/0847; H04L 43/16; H04L 43/0817
USPC ................ 370/240, 230, 231, 232, 233, 235, 370/236.2, 242, 247, 252
See application file for complete search history.

(56) References Cited

U.S. PATENT DOCUMENTS 7,961,632 B2 *   6/2011   Kondo ........................ 370/241.1
8,730,821 B2 *   5/2014   Song et al. ................. 370/241.1
(Continued)

FOREIGN PATENT DOCUMENTS

CN       101605020 A      12/2009
CN       101729197 A      6/2010
(Continued)

OTHER PUBLICATIONS

ITU-T "Series Y: Global Information Infrastructure, Internet Protocol Aspects and Next-Generation Networks", Telecommunication Standardization Sector of ITU, Feb. 2008, Y.1731.
(Continued)

*Primary Examiner* — Hanh N Nguyen
(74) *Attorney, Agent, or Firm* — Sughrue Mion, PLLC

(57) ABSTRACT

A communication device includes a receiving unit configured to receive a frame via a connected packet network, a transmitting unit configured to transmit the received frame and a self-originating frame to the packet network, a monitoring unit configured to monitor a flow rate of the transmitted frames, a transmission cycle setting unit configured to cause a transmission cycle of the self-originating OAM frame to be a predetermined transmission cycle set for a normal condition when the flow rate of the frames is greater than or equal to a predetermined threshold, and a transmission cycle calculating unit configured to calculate a transmission cycle of the OAM frame that can compensate for a shortfall in the number of the transmitted frames, the transmission cycle calculating unit being configured to cause the calculated transmission cycle to be a transmission cycle of the self-originating OAM frame when the flow rate of the frames is less than the predetermined threshold.

4 Claims, 6 Drawing Sheets

(51) Int. Cl.
*H04L 12/26* (2006.01)
*H04L 1/00* (2006.01)

(56) References Cited

U.S. PATENT DOCUMENTS

| | | | |
|---|---|---|---|
| 2007/0064611 A1* | 3/2007 | He | 370/236.2 |
| 2008/0031146 A1* | 2/2008 | Kwak et al. | 370/250 |
| 2010/0020698 A1* | 1/2010 | Kondo | 370/241.1 |
| 2012/0020232 A1* | 1/2012 | Yoshioka et al. | 370/252 |

FOREIGN PATENT DOCUMENTS

| | | | | |
|---|---|---|---|---|
| JP | 2007251541 | * | 9/2007 | H04L 29/14 |
| JP | 2009-130474 A | | 6/2009 | |
| JP | 2009-130786 A | | 6/2009 | |
| JP | 2009-153028 A | | 7/2009 | |
| JP | 2009-224947 A | | 10/2009 | |
| JP | 2010-50857 A | | 3/2010 | |
| JP | 2011-114380 A | | 6/2011 | |

OTHER PUBLICATIONS

ITU-T, "Series G: Transmission Systems and Media, Digital Systems and Networks; Series Y: Global Information Infrastructure, Internet Protocol Aspects and Next-Generation Networks", Telecommunication Standardization Sector of ITU, Dec. 2007, G.8021/Y.1341.

International Search Report for PCT/JP2011/066694 dated Sep. 27, 2011.

Communication dated Nov. 4, 2014, issued by the State Intellectual Property Office of the People's Republic of China in counterpart Application No. 201180036604.6.

* cited by examiner

FIG. 6

| SHORTFALL IN NUMBER OF FRAMES | TRANSMISSION CYCLE OF OAM FRAME |
|---|---|
| $0 < N\_Lack < TH1$ | 10 FRAME/SECOND |
| $TH1 < N\_Lack < TH2$ | 100 FRAME/SECOND |
| $TH2 < N\_Lack < TH3$ | 1000 FRAME/SECOND |
| ⋮ | ⋮ |
| $THn-1 < N\_Lack < THn$ | $10^m$ FRAME/SECOND |

※ N_Lack:TH_Deg-N_Tx_DATA-N_Tx_OAM)

US 9,077,629 B2

COMMUNICATION DEVICE, AND SIGNAL DEGRADATION MONITORING SYSTEM AND METHOD

TECHNICAL FIELD

The present invention relates to a communication device, and a signal degradation monitoring system and a signal degradation monitoring method, and more particularly, to a communication device, and a signal degradation monitoring system and a signal degradation monitoring method, which can detect the signal degradation on a packet network.

The application claims priority to and the benefit of Japanese Patent Application No. 2010-172476 filed on Jul. 30, 2010, the disclosure of which is incorporated herein by reference.

BACKGROUND ART

In recent years, Recommendation Y.1731 is regulated as a maintenance function (OAM (operations, administration, and maintenance) function) in a packet network in the ITU-T (International Telecommunication Union-Telecommunication Standardization Sector). In addition, in order to apply the existing MPLS (Multi Protocol Label Switching) to a carrier network, standardization of MPLS-TP (Multi Protocol Label Switching Transport Profile) that is an expansion of the OAM function is underway by both the IETF and the ITU-T.

In the OAM function of the existing MPLS-TP or the Recommendation Y.1731, an MEP (Maintenance End Point) is defined in each of any two points within a network, and various OAM frames are transmitted and received between these MEPs, thereby monitoring a path or the like between the two points. An LM (Loss Measurement) function is one example of the OAM function.

This LM function is a function of loading the number of transmitted and received frames counted in MEPs of the transmitting and receiving sides on LM frames, mutually exchanging the frames, and thus detecting a frame loss by virtue of a difference between the number of transmitted frames counted in the transmitting-side MEP and the number of received frames counted in the receiving-side MEP.

It is possible to monitor a line quality between the MEPs using the LM function.

Hereinafter, a mechanism for detecting signal degradation by virtue of the LM function that is a related art will be described.

First, an ME (Maintenance Entity) is set between communication devices that try to monitor the line quality. The ME is a unit to be monitored using the OAM function, and may be set for each flow, section, path or the like to be monitored. Both ends of the ME are the MEP described above.

The MEP set in the transmitting-side communication device is referred to as a transmission source MEP, and the MEP set in the communication device of the receiving side is referred to as a destination MEP. In addition, the transmitting-side communication device is referred to as a transmission source node, and the receiving-side communication device is referred to as a destination node.

The transmission source MEP counts the number of OAM frames and the data frames associated with the ME that the transmission source node transmits to the destination node. In addition, the destination MEP counts the number of received OAM frames and the data frames associated with the ME.

The number of frames counted in the MEP is loaded on the OAM frame (CCM (Continuity Check Message) frame) that is periodically transmitted and received as the LM message, and is transmitted from the destination MEP to the transmission source MEP.

The transmission source MEP that has received the frames counted in the destination MEP by means of transmission calculates the number of lost frames by virtue of the equation below.

[Number of transmitted frames (current value)−number of transmitted frames (previous value)]−[number of received frames (current value)−number of received frames (previous value)]

In addition, according to the definition of the signal degradation recommended in the Recommendation G.8021, the signal degradation state is regarded as being detected when the number of transmitted frames exceeds a preset threshold (the minimum number of the transmitted frames) and the rate of the lost frames calculated from the number of lost frames exceeds a signal degradation threshold.

That is, when the number of transmitted frames does not exceed the minimum number of transmitted frames, it is not possible to detect the signal degradation state.

By monitoring the line quality in this way, it is possible to issue a signal degradation warning in the line in which the frame loss is occurring and to bypass the failed location, thereby providing a network with high reliability.

In addition, the signal degradation detection (measurement on the line quality) is also defined in the Recommendation G.8021 regulated by the ITU-T.

FIG. 7 is a diagram illustrating data frames transmitted and received between a transmitting-side communication device and a receiving-side communication device.

As shown in the diagram, counting the number of data frames sandwiched between the CCM frames being transmitted and received between the transmitting-side communication device and the receiving-side communication device and measuring the line quality from these counted values are defined in the Recommendation G.8021.

In particular, it is necessary to cause the number of transmitted frames to be greater than a regulated threshold, and it is necessary to transmit and receive the number of frames within a certain period of time in order to measure the signal degradation in the Recommendation G.8021.

In addition, Patent Document 1 describes a connectivity loss detecting method, in which the method detects when an L2 switch to periodically receive an ETH-CCM using a message that becomes the ETH-CCM capable of regulating any of seven kinds of cycle information with 3 bits as a message related to terms of checking the flow rate of the data frames for checking connectivity between management points has not received the ETH-CCM for at least a time duration that is three and a half times longer than the cycle indicated in the cycle information is described in.

In addition, a system for preparing a communication device with a transmission functional unit and a reception functional unit as a device that performs packet switching, causing a statistical information accumulation circuit to compare statistical information of a communication device of a local station with statistical information of the opposite communication device when a data frame reception circuit of the reception functional unit has received statistical information from the opposite communication device, and determining whether or not the data frame is lost in the transmission path is disclosed as a device for exchanging packets in Patent Document 2.

In addition, a system in which measurement nodes regularly or periodically measure traffic states of the routers and transmit measurement packets indicating the communication quality to an external network monitoring device via a dedicated communication path is disclosed in Patent Document 3.

DOCUMENTS OF THE PRIOR ART

Patent Documents

Patent Document 1: Japanese Unexamined Patent Application, First Publication No. 2009-130474
Patent Document 2: Japanese Unexamined Patent Application, First Publication No. 2009-130786
Patent Document 3: Japanese Unexamined Patent Application, First Publication No. 2009-224947

DISCLOSURE OF INVENTION

Problems to be Solved by the Invention

However, in the method of monitoring the signal degradation in the packet network of the related art described in the Background art, it is not possible to detect the signal degradation state when the number of transmitted frames does not exceed the minimum number of transmitted frames.

For example, in a case of conforming to the definition on the signal degradation recommended in the Recommendation G.8021, the signal degradation state is regarded as being detected when the calculated rate of the lost frames exceeds the signal degradation threshold while the number of transmitted frames exceeds the preset threshold (the minimum number of transmitted frames) as described above. Accordingly, the signal degradation state cannot be detected when the number of transmitted frames does not exceed the minimum number of transmitted frames in this definition.

FIG. 8 is a diagram illustrating other data frames transmitted and received between the transmitting-side communication device and the receiving-side communication device.

As shown in FIG. 8, when there is little to no data to be transmitted, the data frames do not necessarily flow, and it is not possible to monitor and detect the signal degradation according to the method regulated in the Recommendation G.8021.

FIG. 9 is a diagram illustrating data frames transmitted and received between the transmitting-side communication device and the receiving-side communication device with dummy frames inserted.

In the technique described in patent document (Japanese Patent Application No. 2009-266344), a method of estimating a transmission path quality for the purpose of rapidly measuring a bit error rate in a packet transmission network is disclosed. This method is a method of monitoring a transmission flow rate, and generating and transmitting the dummy packet as shown in FIG. 9 when there is no data packet to be transmitted.

Accordingly, in the technique described in the patent document (Japanese Patent Application No. 2009-266344), the dummy packet is necessarily inserted when there is no packet to be transmitted.

The method is thus a suitable method when the quality of the section between adjacent nodes is monitored. However, when paths via a plurality of communication devices are monitored, the method is not a suitable method of monitoring the paths because a band is occupied by the dummy packet and thus affects other paths.

The present invention has been made in consideration of the above problems of the related art, and a purpose of the present invention is to provide a communication device, a signal degradation monitoring system, and a signal degradation monitoring method, which can detect the signal degradation even when the number of the data frames of the user flowing on a packet network is small or the data frames do not flow in the packet network.

Means for Solving the Problem

To solve the problems mentioned above, a communication device of the present invention provides a receiving unit configured to receive a frame via a connected packet network; a transmitting unit configured to transmit the received frame and a self-originating frame to the packet network; a monitoring unit configured to monitor a flow rate of the transmitted frames; a transmission cycle setting unit configured to cause a transmission cycle of the self-originating OAM frame to be a predetermined transmission cycle set for a normal condition when the flow rate of the frames is greater than or equal to a predetermined threshold; and a transmission cycle calculating unit configured to calculate a transmission cycle of the OAM frame that can compensate for a shortfall in the number of the transmitted frames, and the transmission cycle calculating unit is configured to cause the calculated transmission cycle to be the transmission cycle of the self-originating OAM frame when the flow rate of the frames is less than the predetermined threshold.

In addition, a signal degradation monitoring system of the present invention provides a means for monitoring a flow rate of frames being transmitted and received; a means for causing a transmission cycle of an OAM frame to be a predetermined transmission cycle set for a normal state when the flow rate of the frames is greater than or equal to a predetermined threshold; and a means for calculating a transmission cycle of the OAM frame that can compensate for a shortfall in the number of the transmitted frames and causing the calculated transmission cycle to be the transmission cycle of the OAM frame when the flow rate of the frames is less than the predetermined threshold.

In addition, a signal degradation monitoring method of the present invention includes monitoring a flow rate of frames being transmitted and received; causing a transmission cycle of an OAM frame to be a predetermined transmission cycle set for a normal state when the flow rate of the frames is equal to or greater than a predetermined threshold; and calculating a transmission cycle of the OAM frame that can compensate for a shortfall in the number of the transmitted frames and causing the calculated transmission cycle to be the transmission cycle of the OAM frame when the flow rate of the frames is less than the predetermined threshold.

In addition, the outline of the present invention is a scheme in which:
(1) a line quality between communication devices in a packet network is monitored by comparison of the number of transmitted and received frames,
(2) a flow rate of data frames between communication devices is monitored, and
(3) a transmission cycle of an OAM frame (CCM frame) is changed to cause a certain amount of flow rate (traffic) to be given when the corresponding flow rate is smaller than a threshold that may be used for measuring the line quality.

Accordingly, the technique described in Patent Document 1 indicates a method of detecting the connectivity loss, which is thus different from the purpose of the present invention.

In addition, the techniques described in Patent Documents 2 and 3 do not include as constituent elements item (3) described above in the outline of the present invention.

Effect of the Invention

As described above, according to the communication device of the present invention, the transmission cycle of the OAM frame (CCM frame) is increased when the flow rate of data frames of the user is small, and it is thus possible to detect the signal degradation even in such a case.

In addition, a frame (i.e., OAM frame) regulated in the Recommendation Y.1731 or MPLS-TP standardization is used as a frame for transferring information necessary for maintenance in a packet network, and it is thus possible to contrast a case in which the present invention is used with a device that does not correspond to the present invention.

BRIEF DESCRIPTION OF THE DRAWINGS

FIG. 6 is a diagram illustrating a relationship in which a shortfall in the number of frames that is expected in advance and a transmission cycle of the OAM frame that can appropriately deal with the shortfall in the number of frames are associated with each other.

EMBODIMENTS FOR CARRYING OUT THE INVENTION

The present invention enables a communication device in a packet network to detect the signal degradation by monitoring a flow rate of data frames being transmitted, changing a transmission cycle of an OAM frame (CCM (Continuity Check Message) frame) and causing a certain amount of the traffic or more to be given when the flow rate is smaller than a threshold that may be used for detecting the signal degradation.

In addition, in the Recommendation Y.1731, 7 kinds of cycles ranging from a cycle of 3.33 milliseconds to a cycle of 10 minutes are defined for the transmission cycle of the CCM frame, and the CCM frame is transmitted at a cycle of one second so as to verify connectivity in the normal state.

In the present invention, when the flow rate of data frames of the user is small and it is difficult to detect the signal degradation at the opposite side, the transmission cycle of the CCM frame is controlled to increase the flow rate of the traffic, and the CCM frame is used along with the data frame for line quality measurement in the communication device of the opposite side.

Therefore, since the line quality can be monitored, it is possible to detect the signal degradation even when the flow rate of the data frames is small in the present invention.

Hereinafter, embodiments of the communication device, the signal degradation monitoring system, and the signal degradation monitoring method of the present invention will be described with in detail reference to drawings.

Figure 1:
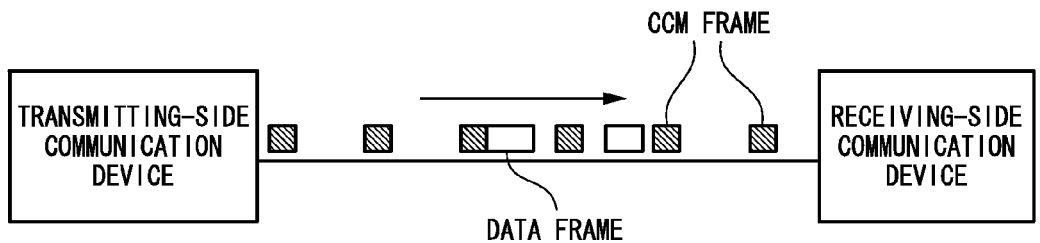
FIG. 1 is a diagram illustrating a communication state when a flow rate of data frames of a user transmitted between a transmitting-side communication device and a receiving-side communication device is small.

FIG. 1 is a diagram illustrating a communication state when the flow rate of data frames of the user transmitted between a transmitting-side communication device and a receiving-side communication device is small.

When the data frames of the user are not transmitted or the flow rate of data frames of the user being transmitted is small as shown in FIG. 1, it is possible to carry out monitoring and detection on the signal degradation by changing the transmission cycle of the hatched CCM frames and compensating a minimum required amount of frames so as to detect the signal degradation in the communication device of the opposite side.

Figure 2:
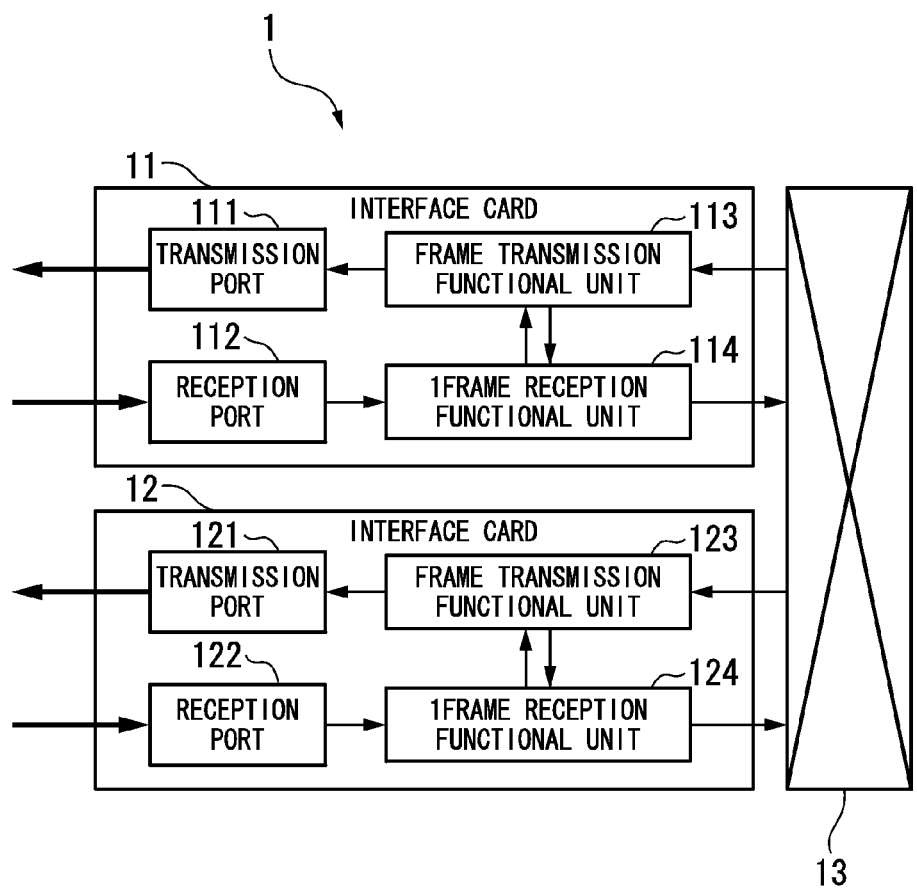
FIG. 2 is a configuration diagram illustrating an overall configuration of a communication device according to an embodiment of the present invention.

FIG. 2 is a diagram illustrating an overall configuration of a communication device according to an embodiment of the present invention.

In this figure, the communication device 1 of the present embodiment has one or a plurality of interface cards (in this case, an interface card 11 and an interface card 12) connected via a packet switch 13.

In this case, the interface card 11 has a transmission port 111, a reception port 112, a frame transmission functional unit 113, and a frame reception functional unit 114.

In this case, the interface card 12 has a transmission port 121, a reception port 122, a frame transmission functional unit 123, and a frame reception functional unit 124.

However, the configuration of the communication device 1 shown in FIG. 2 is merely an example of the communication device according to the present invention, and the configuration of the communication device according to the present invention is not limited to the configuration shown in FIG. 2.

For example, the present invention may be applied even to a communication device having a configuration in which the interface cards 11 and 12 and the packet switch 13 are integrated together.

In addition, each interface card has one pair of a transmission port and a reception port herein. However, in general, the communication device according to the present invention may have multiple ports.

Figure 3:
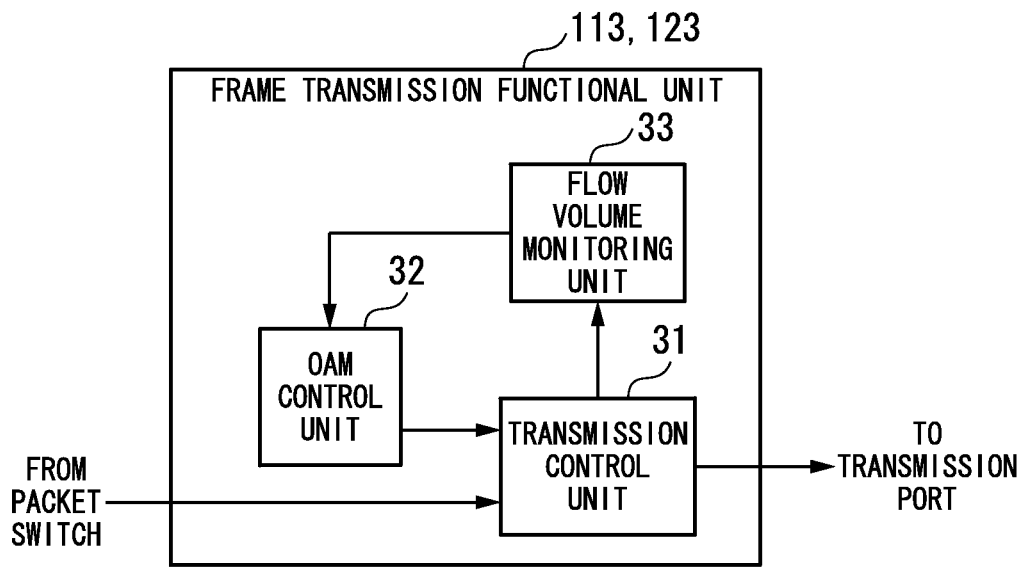
FIG. 3 is a block configuration diagram illustrating a frame transmission functional unit of the communication device.

FIG. 3 is a block configuration diagram illustrating a frame transmission functional unit of the communication device 1 according to the present embodiment.

As shown in this figure, the frame transmission functional unit (in this case, frame transmission functional units 113 and 123) of the communication device according to the present invention has a transmission control unit 31, an OAM control unit 32, and a flow rate monitoring unit 33.

The transmission control unit 31 controls transmission of the data frame or the OAM frame.

The OAM control unit 32 carries out processes of the OAM function. That is, the OAM control unit 32 carries out management on ME and MEP, generation of an OAM frame, insertion of an OAM frame, and so forth.

The flow rate monitoring unit 33 monitors flow rates (i.e., a sum of the number of frames flowing into a communication device of a local station and the number of frames originating from the communication device of a local station in each of the data frame and the OAM frame) of the OAM frame and the data frame being transmitted from the transmission control unit 31.

Figure 4:
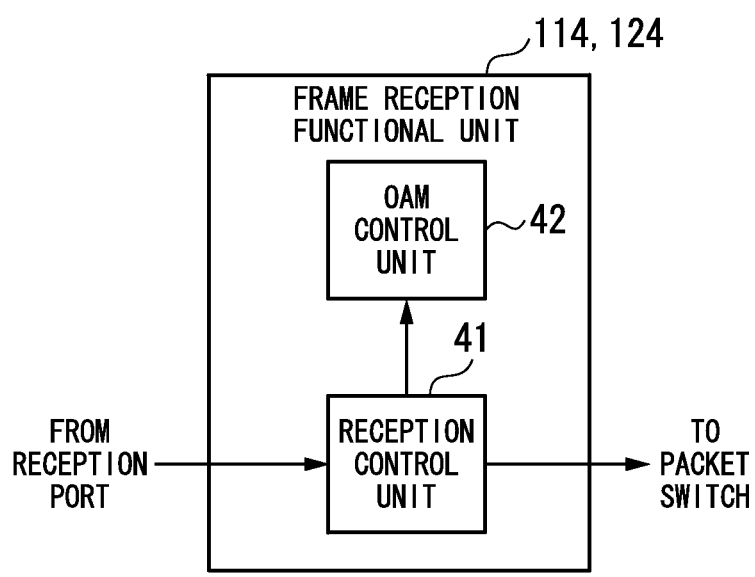
FIG. 4 is a block configuration diagram illustrating a frame reception functional unit of the communication device.

FIG. 4 is a block diagram illustrating a frame reception functional unit of the communication device 1 according to the present embodiment.

As shown in this figure, the frame reception functional unit (in this case, frame reception functional units 114 and 124) of the communication device according to the present invention has a reception control unit 41 and an OAM control unit 42.

The reception control unit 41 carries out processes of the data frame and the OAM frame received from the reception port. When the reception control unit has received the OAM frame, the reception control unit forwards this OAM frame to the OAM control unit 42.

In addition, the reception control unit 41 may have a counter that is not shown to count the number of received frames of each of the data frame and the OAM frame. The counted result is also transmitted to the OAM control unit 42.

The OAM control unit 42 carries out the process according to the function of the received OAM frame. The OAM control unit calculates the number of frames to be discarded based on the number of received frames counted by the reception control unit 41.

Although a functional block associated with the transmission process of the data frame is necessary in the configuration of the communication device shown in FIGS. 2 to 4, this functional block is not directly associated with the present invention, and a detailed configuration thereof is thus omitted. The functional block associated with the transmission process of the data frame is a block of a destination search process of the data frame, a QoS (Quality of Service) functional process block, or the like.

Figure 5A:
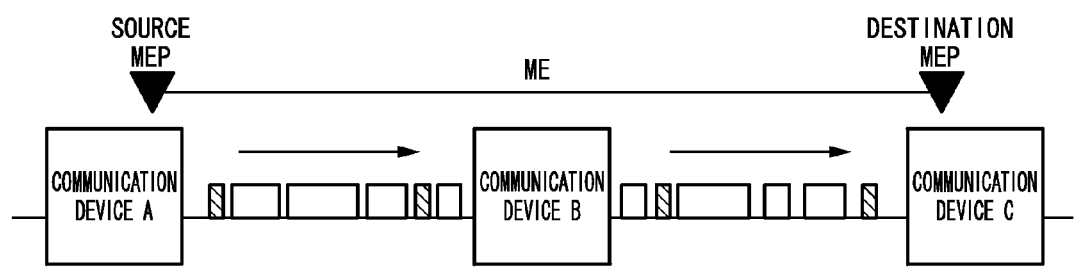
FIG. 5A is a diagram illustrating an example of a network to which a plurality of communication devices according to the present invention are connected.
Figure 5B:
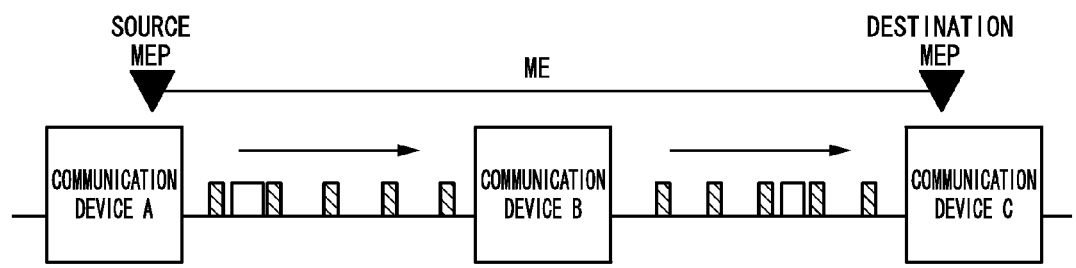
FIG. 5B is a diagram illustrating another example of the data flow rate in the example of the network mentioned above.
Figure 7:
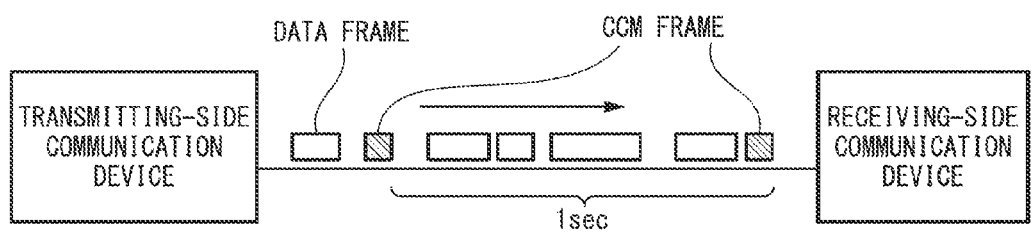
FIG. 7 is a diagram illustrating data frames transmitted and received between a transmitting-side communication device and a receiving-side communication device.
Figure 8:
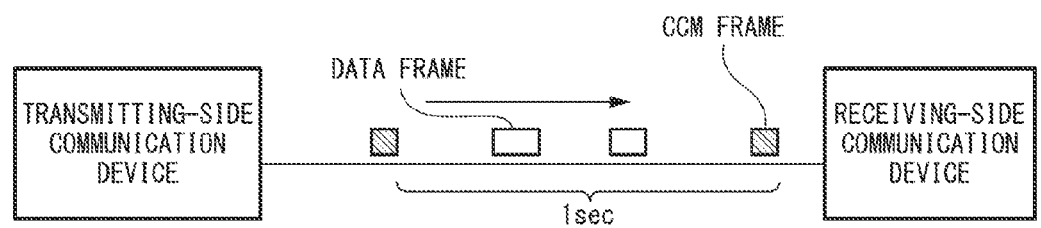
FIG. 8 is a diagram illustrating another state of data frames transmitted and received between a transmitting-side communication device and a receiving-side communication device.
Figure 9:
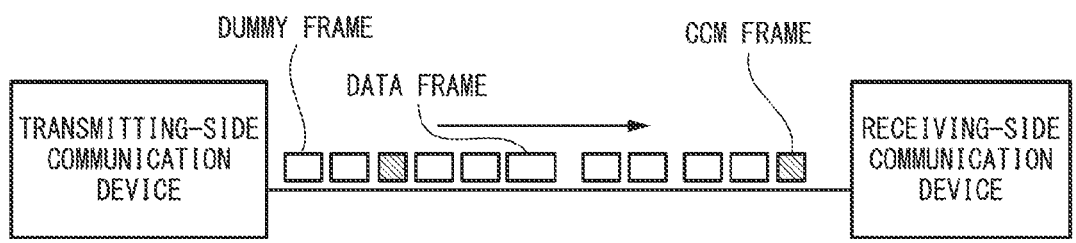
FIG. 9 is a diagram illustrating data frames transmitted and received between a transmitting-side communication device and a receiving-side communication device with dummy frames inserted.

FIGS. 5A and 5B are diagrams illustrating an example of the network to which a plurality of communication devices according to the present embodiment are connected.

Hereinafter, operations of the signal degradation monitoring system in a packet network according to the embodiment of the present invention will be described with reference to FIGS. 5A and 5B.

In the network shown in FIGS. 5A and 5B, an ME is set between the communication devices A and C when the communication devices A, B, and C that are the communication devices 1 according to the embodiment of the present invention are connected on a network.

In this case, the communication device A is set as a transmission node, the set MEP is set as a transmission source MEP, the communication device C is set as a reception node, and the set MEP is set as a destination MEP in FIGS. 5A and 5B (the communication device B causes the OAM frame associated with the ME to be passed).

In addition, the data frame and the OAM frame described in FIGS. 5A and 5B are all set as frames associated with the ME that is set between the communication devices A to C.

In fact, although other frames are also multiplexed and transmitted between the communication devices A to C, these other frames are omitted herein.

The transmission control unit 31 of the communication device A counts the number of transmission frames of the OAM frame and the data frame associated with the ME. In this case, the number of transmission frame of the data frame is set as N_Tx_DATA, and the number of transmission frame of the OAM frame is set as N_Tx_OAM.

In addition, the flow rate monitoring unit 33 of the communication device A carries out comparison with a threshold (a minimum number of transmission frames) necessary to detect the signal degradation in the communication device C.

In this case, the threshold necessary to detect the signal degradation is set as TH_Deg. TH_Deg may be set to have a unique value for each ME so as to set the quality to be guaranteed in a monitoring ME unit.

As shown in FIG. 5A, when the flow rate of the data frame is great and is N_Tx_DATA+N_Tx_OAM≥TH_Deg, a transmission cycle that is set for a normal state is used to the transmission cycle of the OAM frame (CCM frame).

On the other hand, as shown in FIG. 5B, when the flow rate of the data frame is small and becomes N_Tx_DATA+N_Tx_OAM<TH_Deg, the flow rate monitoring unit 33 of the communication device A calculates the transmission cycle of the OAM frame that may compensate for the shortfall in the number of transmission frames, and similarly notifies the OAM control unit 32 of the change request of the transmission cycle.

The OAM control unit 32 of the communication device A changes the transmission cycle of the OAM frame (CCM frame) in response to the change request after it receives the change request of the transmission cycle of the OAM frame.

FIG. 6 is a diagram illustrating a relationship in which a shortfall in the number of frames that is expected in advance and a transmission cycle of the OAM frame that can appropriately deal with the shortfall in the number of frames are associated with each other Calculation of the transmission cycle may be carried out by calculating the number of frames that compensates for the shortfall from (TH_Deg−N_Tx_DATA−N_Tx_OAM) in the flow rate monitoring unit 33. However, it is also possible to appropriately determine the corresponding transmission cycle by virtue of the shortfall in the number of frames in advance as shown in FIG. 6.

Since the communication device B does not have a monitoring point associated with the ME, the data frame and the OAM frame are also made to pass.

The communication device C counts the number of received frames of the OAM frame and the received data frame associated with the ME.

As is apparent from the description made above, it is possible for the signal degradation monitoring system according to the present embodiment to detect the signal degradation even when the flow rate of the data frame is small.

In addition, since the OAM frame (CCM frame) is used to detect the signal degradation, it is not necessary to add a function of newly generating a separate frame.

In addition, since the transmission cycle of the OAM frame having the CCM function is variable in the OAM function such as MPLS-TP for which standardization is underway or the Recommendation Y.173 of the ITU-T, the communication device implementing the OAM function necessarily has a functional block that changes the transmission cycle of the OAM frame.

In addition, the communication device implementing the OAM function generally also has a functional block that counts the number of transceived frames. Therefore, an additional circuit necessary to carry out the present invention is only a circuit for comparing the number of transmission frames, thereby enabling the signal degradation to be detected without significantly increasing the cost.

According to the present embodiment, when the flow rate of the data frame of the user is small, the transmission cycle of the CCM frame is increased, and it is thus possible to detect the signal degradation even in such a case.

In addition, since the frame (OAM frame) regulated in the MPLS-TP standardization or the Recommendation Y.1731 is used as the frame for transferring information necessary for maintenance in the packet network, it is possible to contrast a case in which the present invention is used a device that does not correspond to the present invention.

In addition, since the function of changing the transmission cycle of the OAM frame is a necessary function, the present invention can be applied to the communication device of the related art without adding a significant amount of structural elements (such as circuits).

In addition, since the signal degradation is measured by measuring from the number of data frames transmitted by a communication device of the local station, even in a case of monitoring paths via a plurality of communication devices, the signal degradation is measured by merely adding the minimum required amount of OAM frames and it is possible to reduce the influence on other paths.

INDUSTRIAL APPLICABILITY

As described above, according to the communication device of the present invention, the transmission cycle of the OAM frame (CCM frame) is increased when the flow rate of the data frames of the user is small, and it is thus possible to detect the signal degradation even in such a case.

DESCRIPTION OF REFERENCE SYMBOLS 1 communication device
11, 12 interface card
13 packet switch
31 transmission control unit
32 OAM control unit
33 flow rate monitoring unit
41 reception control unit
42 OAM control unit
111, 121 transmission port
112, 122 reception port
113, 123 frame transmission functional unit
114, 124 frame reception functional unit

The invention claimed is:

1. A communication device comprising:
a receiving unit configured to receive a data frame and an OAM frame via a connected packet network;
a transmitting unit configured to transmit the received frames and a self-originating OAM frame to the packet network;
a monitoring unit configured to monitor a flow rate of the transmitted frames, the monitoring unit being configured to calculate a transmission cycle of the OAM frame that compensates for a shortfall in a number of the transmitted frames based on a number of the data frames, a number of the OAM frame and a predetermined threshold;
an OAM control unit configured to cause a transmission cycle of the self-originating OAM frame to be a predetermined transmission cycle set for a normal condition when the flow rate of the transmitted frames is greater than or equal to the predetermined threshold, and to cause the calculated transmission cycle to be the transmission cycle of the self-originating OAM frame when the flow rate of the transmitted frames is less than the predetermined threshold.

2. The communication device according to claim 1, wherein
the communication device is configured to include a data table in which a shortfall in the number of frames that is expected in advance and a transmission cycle of the OAM frame that can compensate for the shortfall in the number of frames are associated with each other,
wherein the data table is referred to when the transmission cycle of the OAM frame is calculated.

3. A signal degradation monitoring system comprising:
a monitoring unit configured to monitor a flow rate of a data frame, an OAM frame and a self-originating OAM frame being transmitted and received, the monitoring unit being configured to calculate a transmission cycle of the OAM frame that compensates for a shortfall in the number of the transmitted frames based on a number of the data frames, a number of the OAM frame and a predetermined threshold; and
an OAM control unit configured to cause a transmission cycle of the self-originating OAM frame to be a predetermined transmission cycle set for a normal state when the flow rate of the transmitted frames is equal to or greater than the predetermined threshold, and to cause the calculated transmission cycle to be the transmission cycle of the OAM frame when the flow rate of the transmitted frames is less than the predetermined threshold.

4. A signal degradation monitoring method comprising:
monitoring a flow rate of a data frame, an OAM frame and a self-originating OAM frame being transmitted and received;
calculating a transmission cycle of the OAM frame that compensates for a shortfall in a number of the transmitted frames based on a number of the data frames, a number of the OAM frame and a predetermined threshold;
causing a transmission cycle of the self-originating OAM frame to be a predetermined transmission cycle set for a normal state when the flow rate of the transmitted frames is greater than or equal to the predetermined threshold; and
causing the calculated transmission cycle to be the transmission cycle of the OAM frame when the flow rate of the transmitted frames is less than the predetermined threshold.

* * * * *